UNITED STATES PATENT OFFICE 2,118,995

PROCESS OF PREPARING SULPHONIC ACIDS OF ALIPHATIC ETHERS OF HIGH MOLECULAR WEIGHT

Edmund Waldmann, Klosterneuburg, and August Chwala, Vienna, Austria, assignors to I. G. Farbenindustrie Aktiengesellschaft, Frankfort-on-the-Main, Germany No Drawing. Application November 19, 1936, Serial No. 111,740. In Austria October 7, 1933

6 Claims. (Cl. 260—124)

The present invention relates to a process of preparing sulphonic acids of aliphatic ethers of high molecular weight.

This application is a continuation-in-part of U. S. Application No. 747,250, filed October 6, 1934 in the name of Edmund Waldmann and August Chwala for Wetting, cleansing and dispersing agents and process of preparing them.

We have found that sulphonic acids of aliphatic ethers of high molecular weight are obtainable by acylating at the nitrogen the sulphonic acids of amino ethers or their salts with fatty acids containing at least 10 carbon atoms in the molecule, naphthenic or resinic acids or the halides or anhydrides of these acids.

As parent materials for these compounds there are used dihalogenated ethers. They are converted into the halogenated ether sulphonic acids by causing them to react with sodium or ammonium sulphite, which is used either in approximately equimolecular or smaller quantities in the solid state or in aqueous alcohol solution, according to the reactivity of the halogen atoms present in the dihalogenated ethers. By heating the halogenated ether sulphonic acids as obtained with ammonia or primary amines, the halogen is replaced by nitrogen with formation of amino-ether sulphonic acids, which are then acylated at the nitrogen by heating them with a molar quantity of a fatty acid such as oleic acid, palmitic acid, or by treating them with the chloride of a fatty acid.

By using as dihalogenated ether, for instance, beta-beta-dichlorodiethylether, there are obtained:

ClCH₂CH₂—O—CH₂CH₂Cl
ClCH₂CH₂—O—CH₂CH₂SO₃Na
CH₃NHCH₂CH₂—O—CH₂CH₂SO₃Na
C₁₁H₂₃CON(CH₃)CH₂CH₂—O—CH₂CH₂SO₃Na
(C₁₁H₂₃CO—=radical of the lauric acid).

The products of the present invention constitute, in the form of their alkali salts or salts of organic bases, valuable wetting, washing, emulsifying, and the like agents and in the form of free acids, they are also effective carbonizing agents. They are stable to the action of calcium and magnesium salts, prevent the precipitation of calcium and magnesium soaps, and exhibit their valuable properties not only in neutral, but also in strongly acid and alkaline solutions, against the action of which they are remarkably stable.

All these compounds contain ether groups. The presence of this group causes, in contrast to similarly constituted compounds which do not contain it, an increase in various valuable properties, especially, for instance, an increase in the ability to keep calcium soaps in a colloidal solution.

In the above mentioned reactions there may also be used, as dihalogenated ethers, the condensation products of aldehydes especially formaldehyde, with hydrochloric acid, for instance, of the composition:

the condensation products of halogenated mono- or polyhydric alcohols with aldehydes, particularly formaldehyde and hydrochloric acid, such as

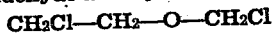

furthermore the ethers of halogen hydrines of polyhydric alcohols, for example, the methylether of beta-beta-glycerine-dichlorohydrine, and the alkyl ether of peta-erythrit-di-(or tri-)chlorohydrine

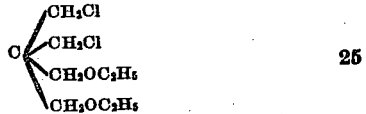

As fatty acids of high molecular weight those containing more than 10 carbon atoms in the molecule are used, for instance, lauric, myristic, palmitic, oleic, linoleic, linolenic or eleostearic acid. These acids may also be used in the form of natural mixtures.

The following examples serve to illustrate the invention, but they are not intended to limit it thereto; the parts are by weight:

(1) 142 grams of dichlorodiethylether (1 mol.) are heated for several hours in an autoclave at 120°–130° C. together with 20 grams of NaHS, dissolved in alcohol, with addition of 1–2 grams of potassium iodide.

After cooling, the contents of the autoclave is filtered from the NaCl formed, the alcohol is distilled from the water bath and the residue which contains, besides unaltered dichloroether, the chloro-ether-mercaptan formed of the following formula

is decomposed into its components by fractional distillation under reduced pressure.

40 grams of the mercaptan are caused to run drop by drop into hot dilute nitric acid, whereby the chloroether sulphonic acid

is formed by oxidation of the mercaptan group. The acid solution is concentrated in the water bath as much as possible, in order to eliminate the HNO₃ in excess, then neutralized by means of NaOH and recrystallized.

21 grams of the sodium sulphonate (1/50 mol.) are heated for some hours in the autoclave at 120° C. with 30 grams of an aqueous solution of methylamine of 33% strength (1/50 mol.). After cooling, 4 grams of NaOH (1/50 mol.) are added and the methylamine in excess is distilled off.

To the concentrated aqueous solution of the resulting amino compound

CH₃NH—CH₂CH₂—O—CH₂CH₂SO₃Na there is added while stirring and cooling, a solution in benzene of 1/50 mol. of lauric acid chloride in portions alternating with the addition in portions of 1/50 mol. of aqueous caustic soda solution. After the reaction has been completed, the benzene is distilled off, the mixture is dried and extracted with alcohol and the alcoholic filtrate evaporated. There remains a substance which is mainly a body of the following composition:

C₁₁H₂₃CON(CH₃)—CH₂CH₂—O—CH₂CH₂SO₃Na

Instead of methylamine there may be used in the above example ethylamine, aniline and the like. The lauric acid chloride may likewise be replaced by the equivalent quantity of abietic acid chloride.

(2) 40 grams of crystallized sodium sulphite are dissolved in 200 grams of water and the whole is boiled with a mixture of 50 grams of beta-beta-dichlorodiethylether of the formula CH₂Cl=CH₂—O—CH₂CH₂Cl and 125 grams of alcohol until a test portion no longer has a definitely perceptible smell of SO₂ on acidification. The duration of the reaction may be shortened by addition of substances which facilitate the reaction, (such as copper, copper salts or iodine salts) or by carrying out the reaction at elevated temperature (use of pressure vessels).

The mixture is then dried and the sodium salt of the chlorinated ether sulphonic acid ClCH₂CH₂—O—CH₂CH₂SO₃Na is extracted by means of hot alcohol. The yield amounts to about 20 grams of sodium salt.

The subsequent transformation of the chlor-ether sulphonic acid obtained into the amino sulphonic acid and its acylation take place as indicated in Example 1.

The dichlorodiethylether used in the above reaction may be replaced by other halogenated ethers, for instance, by beta-chloroethylchloro-methylether of the formula ClCH₂CH₂—O—CH₂Cl by the methylether of glycerinedichlorohydrine of the formula CH₂Cl—CH(OCH₃)—CH₂Cl or the like.

(3) 285 parts of beta-methylamine-ether sodium sulphate (63%, obtainable from beta-beta-dichlorodiethylether by unilateral reaction with sulphite and exchange of the chlorine of the chloroether sulphonic acid obtained for the methylamino-group, are dissolved together with 75 parts of NaCl in 1100 parts of water. 256 parts of oleic acid chloride and 175 parts of caustic soda solution (40° Bé.) are then caused to run in simultaneously in the course of 4 hours, while stirring, at a temperature of 25°–30° C. in such a manner that the reaction is always distinctly alkaline. Thereupon, the whole is heated for a short time to 50° C.–60° C. and rendered feebly alkaline to phenolphthalein by addition of hydrochloric acid. After drying, 650 parts of the reaction product containing 60% of a body having the following constitution

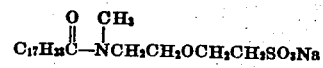

are obtained. The product is soluble in water to a clear solution, has a good dispersive power for Ca soap and may be used as washing agent.

We claim:

1. The process of producing sulphonic acids of high molecular weight of aliphatic amino-ethers which comprises acylating the sulphonic acid of a lower aliphatic amino-ether, including its water-soluble salts with an acid of the group consisting of aliphatic carboxylic acids containing at least 10 carbon atoms, naphthenic acids and resin acids and an anhydride and halide, respectively, of such an acid.

2. The condensation products of the general formula:

RCON(R₁)(R₂O)ₙR₄SO₃Y wherein RCO stands for the acyl radical of a carboxylic acid selected from the group consisting of aliphatic carboxylic acids containing at least 10 carbon atoms, naphthenic acids and resin acids, R₁ stands for a member of the group consisting of hydrogen, lower aliphatic hydrocarbon radicals and aromatic hydrocarbon radicals, R₂ and R₄ stand for lower saturated aliphatic hydrocarbon radicals, n stands for a member of the group consisting of the group 1, 2, and 3, Y stands for a member of the group consisting of hydrogen, alkali metal atoms and ammonium.

3. The condensation products of the general formula:

RCON(R₁)R₂OR₄SO₃Y wherein RCO stands for the acyl radical of a carboxylic acid selected from the group consisting of aliphatic carboxylic acids containing at least 10 carbon atoms, naphthenic acids and resin acids, R₁ stands for a member of the group consisting of hydrogen and hydrocarbon radicals, R₂ and R₄ stand for lower saturated aliphatic hydrocarbon radicals, Y stands for a member of the group consisting of hydrogen, alkali metal atoms and ammonium.

4. The condensation products of the general formula:

RCON(R₁)CH₂CH₂OCH₂CH₂SO₃Y wherein RCO stands for the acyl radical of a carboxylic acid selected from the group consisting of aliphatic carboxylic acids containing at least 10 carbon atoms, naphthenic acids and resin acids; R₁ stands for a member of the group consisting of hydrogen and hydrocarbon radicals; Y stands for a member of the group consisting of hydrogen, alkali metal atoms and ammonium.

5. The condensation product of the formula:

C₁₁H₂₃CON(CH₃)CH₂CH₂OCH₂CH₂SO₃Na

6. The condensation product of the formula:

C₁₇H₃₃CON(CH₃)CH₂CH₂OCH₂CH₂SO₃Na.

EDMUND WALDMANN.
AUGUST CHWALA.